United States Patent [19]

Abboud

[11] Patent Number: 4,928,036
[45] Date of Patent: May 22, 1990

[54] VEHICLE HEADLAMP SYSTEM WITH SERIES HIGH BEAM DAYLIGHT RUNNING LAMP OPERATION

[75] Inventor: Pierre Y. Abboud, Warren, Ohio

[73] Assignee: General Motors Corporation, Detroit, Mich.

[21] Appl. No.: 384,890

[22] Filed: Jul. 24, 1989

Related U.S. Application Data

[63] Continuation of Ser. No. 123,711, Nov. 23, 1987, abandoned.

[51] Int. Cl.$^5$ .............................................. B60Q 1/02
[52] U.S. Cl. .......................................... 315/82; 315/77; 315/76; 307/10.1; 307/10.8
[58] Field of Search ................. 315/70, 77, 76, 80, 315/81, 82, 83, 84; 307/10 LS, 10 R

[56] References Cited

U.S. PATENT DOCUMENTS

| | | | |
|---|---|---|---|
| 3,262,011 | 7/1966 | Cones | 315/77 |
| 3,337,846 | 8/1967 | Hollins | 315/82 |
| 3,341,736 | 9/1967 | Fortney | 315/82 |
| 3,397,342 | 8/1968 | Dill | 315/79 |
| 3,639,805 | 2/1972 | Muench et al. | 315/122 |
| 3,706,005 | 12/1972 | Carlson | 315/82 |
| 3,832,597 | 8/1974 | Mitchell | 315/82 |
| 3,932,788 | 1/1976 | Groover | 315/82 |
| 4,667,129 | 5/1987 | Papillon | 315/82 |
| 4,684,819 | 8/1987 | Haag et al. | 307/10 R |
| 4,686,423 | 7/1987 | Eydt | 315/82 |

Primary Examiner—Leo H. Boudreau
Assistant Examiner—Michael Razavi
Attorney, Agent, or Firm—Robert M. Sigler

[57] ABSTRACT

A headlamp system provides for the high beam headlamp filaments to be connected in series across the supply voltage for half voltage energization in daytime running lamp operation when the ignition switch is closed, a DRL enabling switch is open and the headlamp switch is not in a headlamp on condition. In normal high beam headlamp operation, the high beam filaments are connected across the supply voltage in parallel for full voltage energization. The DRL enabling switch may be a park brake switch. The headlamp switch may have a fog lamp energizing condition to energize fog lamps; and the system permits such energization when the headlamps are connected in series but not when they are connected in parallel in normal high beam operation. A circuit is provided to sense when one of the high beam filaments is burned out and latch the daytime running light operation off with a signal to the vehicle operator.

13 Claims, 2 Drawing Sheets it, in one embodiment, automatic DRL latch-off with
VEHICLE HEADLAMP SYSTEM WITH SERIES HIGH BEAM DAYLIGHT RUNNING LAMP OPERATION This is a continuation of Ser. No. 123,711, filed 11/23/87, now abandoned.

BACKGROUND OF THE INVENTION

This invention relates to daytime running lights for motor vehicles and more particularly to a vehicle headlamp system effective to provide a daytime running lamp (DRL) function with already existing headlamps when the vehicle ignition switch is activated, if permitted by a DRL enabling means. It further provides for automatic change from DRL to normal headlamp operation with activation of the standard headlamp switch and, in one embodiment, automatic DRL latch-off with a signal to the operator if a DRL lamp burns out.

SUMMARY OF THE INVENTION

The headlamp system of the invention modifies a vehicle with an engine and an ignition switch effective to enable engine operation with the inclusion of a source of electric power at a predetermined supply voltage, a pair of headlamps on the front of the vehicle, one on each side thereof, a headlamp switch having off and on conditions, a DRL enabling means, first circuit means connecting one of the headlamps in series with the headlamp switch and electric power source, a DRL activating switch effective in a first condition to connect the other of the headlamps in parallel with the one of the headlamps and in a second condition to connect the other of the headlamps in series with the one of the headlamps and the electric power source, and second circuit means responsive to the ignition switch, headlamp switch and DRL enabling means to put the DRL activating switch in its second condition when the ignition switch is activated, the DRL enabling means is enabled and the headlamp switch is in its off condition, whereby the headlamps are both energized at approximately half the predetermined supply voltage for improved visibility of the vehicle to other vehicle operators during vehicle operation when full headlamp operation is not chosen, and otherwise to put the DRL activating switch in its first condition, whereby the headlamps may both be energized with the predetermined supply voltage for illumination of the road for vehicle operation when full headlamp operation is chosen. Further details and advantages of the invention will be apparent from the accompanying drawings and following description of a preferred embodiment.

DESCRIPTION OF THE PREFERRED EMBODIMENT

Figure 1:
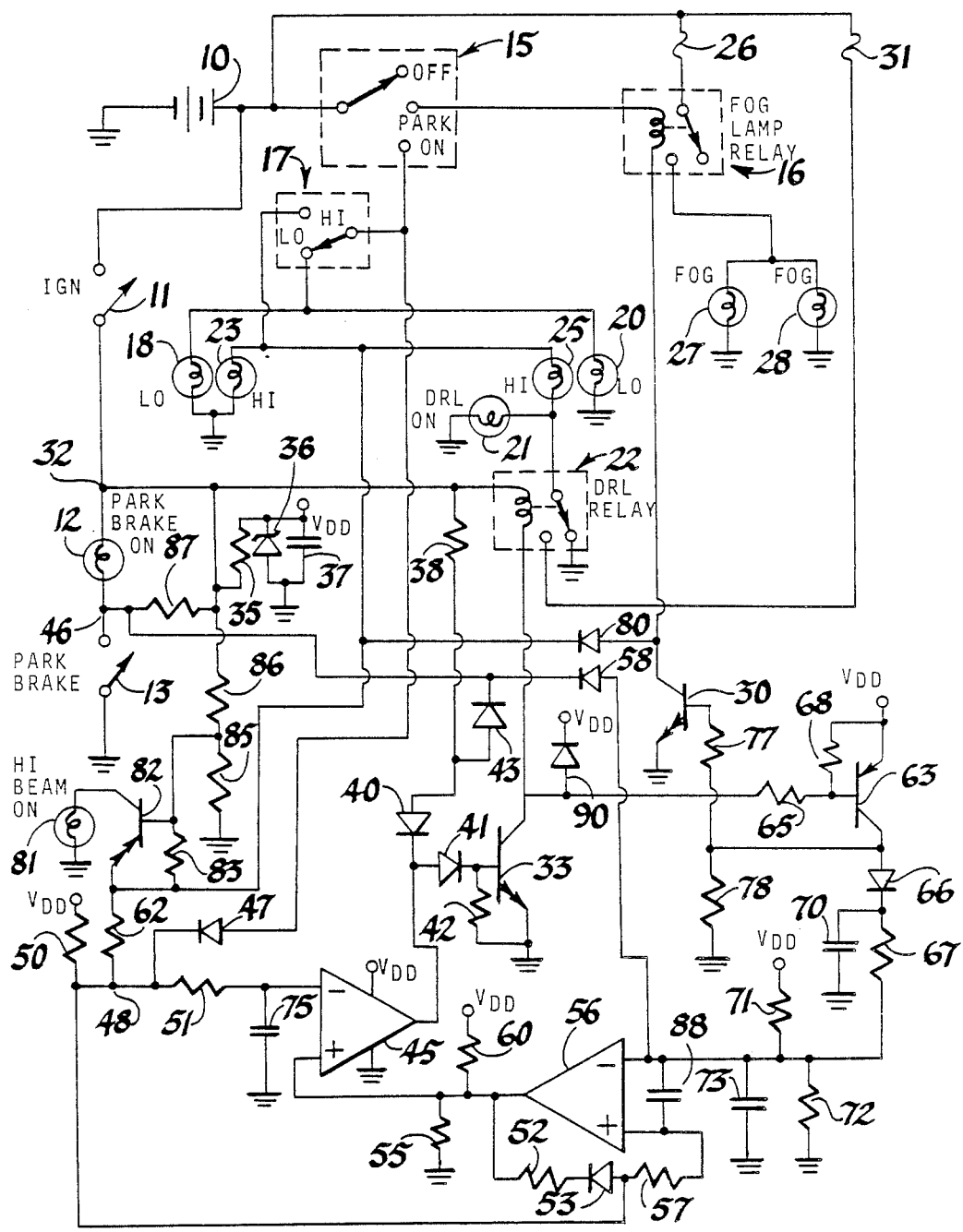
FIG. 1 shows a circuit diagram of a preferred embodiment of the invention.

An electric power source such as vehicle battery 10 has a grounded terminal and a hot terminal connected through a standard vehicle ignition switch 11, a park brake on indicator lamp 12 and a DRL enabling means such as park brake switch 13 in series to ground. Park brake switch 13 is a switch activated when the vehicle is in a parked position, even if the engine is operating. It may be associated with a hand operated park or emergency brake or alternatively may be activated in the park position of an automatic transmission. An alternative DRL enabling means might be an operator controlled DRL enabling switch as an option which can be used or not at the operator's discretion, or a combination of such a discretionary switch and a park brake switch. Other possible embodiments will occur to those skilled in the art.

Battery 10 represents any standard vehicle electrical power system optionally including an engine driven alternator, voltage regulator, etc. Such a system generally has an operating voltage of 12-16 volts. Ignition switch 11 represents a standard ignition switch having at least an off or open condition as shown and a closed or on condition in which the circuit is connected therethrough. Park brake switch 13 has an open condition as shown when the mechanism creating the parked condition is not activated and a closed condition connecting the circuit therethrough when the mechanism is activated.

Battery 10 is also connected to a standard headlamp switch 15, a portion of which is shown. Headlamp switch 15 has an OFF condition as shown and a PARK condition in which battery 10 is connected to energize park lamps, not shown, as well as, optionally, the energizing coil of a fog lamp relay 16. Headlamp switch 15 further has an ON condition in which battery 10 is connected to a standard beam selector switch 17. Beam selector switch 17 has a LO condition as shown in which headlamp switch 15 is connected through a pair of low beam filaments 18 and 20, one on each side of the front of the vehicle, in parallel to ground. Headlamp switch 15 can be considered to be a combination of a headlamp switch having closed (ON) and open (PARK or OFF) conditions for controlling headlamps and a fog lamp switch having closed (PARK) or open (OFF or ON) conditions for controlling fog lamps, yet to be described.

Beam selector switch 17 further has a HI condition in which headlamp switch 15 is connected to the junction of a pair of high beam filaments 23 and 25. High beam filaments 23 and 25 are also located one on each side of the front of the vehicle. The other end of high beam filament 23 is grounded, whereas the other end of high beam filament 25 is connected to ground through a DRL ON indicator lamp 21 and to the armature of a DRL activating switch comprising DRL relay 22 having a normally closed contact connected to ground and a normally open contact.

Battery 10 is connected through a fuse 26 to the armature of fog lamp relay 16 so as to be connected therethrough to energize fog lamps 27 and 28 in parallel when fog lamp relay 16 is in an activated condition but not when fog lamp relay 16 is in an inactivated condition as shown. The activating coil of fog lamp relay 16 connects headlamp switch 15 in its park condition to the collector of an NPN Darlington transistor 30 having a grounded emitter, which transistor 30 controls fog lamp activation when headlamp switch 15 is in its park position. The control of fog lamps with or without daytime running lamps will be described in more detail at a later point in this description.

DRL relay 22 controls the headlamp configuration. In the inactivated condition shown, the high beam filaments are connected across battery 10 in parallel when headlamp switch 15 is in its ON condition and beam selector switch 17 is in its HI condition. This provides normal high beam operation at full operating voltage and therefore full lamp intensity. However, battery 10 is further connected through a fuse 31 to the normally open contact of DRL relay 22 so that, with DRL relay 22 activated, high beam filaments 23 and 25 are connected in series across battery 10. This is the daytime running light condition which is to be activated when the ignition switch is in its on condition, the park brake switch is in its open condition (DRL enabling switch activated) and headlamp switch 15 is in its PARK or OFF condition. The high beam filaments are thus activated at approximately half normal voltage for less intensity to be seen by other drivers rather than illuminate surroundings for the driver of this vehicle. An indication of DRL operation is provided to the vehicle operator by the energization of DRL on indicator lamp 21 when DRL relay 21 is activated.

It should be noted that this operation is for a four lamp system as shown in FIG. 1, wherein each lamp has only one filament. Another possibility is the use of dual filament lamps, wherein the high and low beam filaments are tied together in each lamp on the ground side. In this case, shown in the modification of FIG. 3 with similarly numbered primed components, high and low beam filaments 25' and 20' are both connected to the armature of DRL relay 22', so that both high and low beam filaments will be energized in series with DRL operation.

The activating coil of DRL relay 22 is connected from junction 32 of ignition switch 11 and park brake on indicator lamp 12 to the collector of an NPN Darlington transistor 33 having a grounded emitter so that transistor 33 controls the activation of DRL relay 22. Junction 32 is also connected through a resistor 38 and diodes 40 and 41 in series to the base of transistor 33, which base is connected to its emitter through a biasing resistor 42. Thus, when ignition switch 11 is closed, battery voltage, less two diode drops, is provided to the base of transistor 33, which is thereby biased on to conduct and activate DRL relay 22.

However, the activation of DRL relay 22 by transistor 33 is defeated, by circuitry to be described, when park brake switch 13 is closed, when headlamp switch 15 is in its ON condition, or when either of high beam filaments 23 or 25 is burned out. This circuitry obtains a regulated operating voltage from a terminal $V_{DD}$ connected to terminal 32 through a resistor 35 (100 ohm for a maximum six volt reverse voltage, 470 ohm for 12 volts reverse voltage) and to ground through parallel zener diode 36 (27 v) and capacitor 37 (0.1 uF). This terminal $V_{DD}$ is connected to all other similarly labeled terminals in the circuit and provides a regulated operating voltage for any integrated circuit chips such as the comparators to be described. The connections are actually direct but are shown as terminals to remove the connecting lines and thus simplify FIG. 1.

The circuitry for controlling the operation of transistor 33 includes a comparator 45 with an output connected to the junction of diodes 40 and 41. A diode 43 connects the junction of diode 40 and resistor 38 to the junction 46 of park brake switch 13 and park brake on indicator lamp 12. Comparator 45 is of the type having an output comprising the collector of a grounded emitter transistor: its state is either ground, due to an inverting input at a higher voltage than a non-inverting input, or open collector, with the non-inverting input higher. Thus, transistor 33 may be turned off, even with ignition switch 11 closed, either by the closure of park brake switch 13 or by a ground output of comparator 45. The former occurs when the park brake is activated to close switch 13 (DRL enabling means deactivated); and it causes the junction of diodes 40 and 43 to go to one diode drop above ground, plus, perhaps, a small additional fraction of a volt due to resistance in the park brake switch 13 and its wiring. Diodes 40 and 41 ensure that, in this case, the voltage on the base of transistor 33 is insufficient to turn it on.

The activation of DRL relay 22 will also be defeated if the inverting input of comparator 45 is higher than its non-inverting input and the output is thus grounded. This occurs when normal headlamp operation is selected by means of headlamp switch 15, as described hereinafter. When headlamp switch 15 is in its ON condition, battery 10 is connected through headlamp switch 15 and a diode 47 to a junction 48 of a resistor 50 (150K) connected to terminal $V_{DD}$ and a resistor 51 (400K) connected to the inverting input of comparator 45. This junction 48 is further connected through a diode 53 in series with resistors 52 (20K) and 55 (200K) to ground and, through a resistor 57 (36K) to the non-inverting input of a comparator 56 having an output connected to the junction of resistors 55 and 52 and an inverting input connected through a diode 58 to junction 46 of park brake on lamp 12 and park brake switch 13. The non-inverting input of comparator 45 is connected to the output of comparator 56 and, through a resistor 60 (22K), to terminal $V_{DD}$. Junction 48 is further connected through a resistor 62 (120K) to the junction of high beam filaments 23 and 25.

Assuming comparator 56 has an open collector output, resistors 60 and 55 will establish a voltage of 0.90 $V_{DD}$ on the non-inverting input of comparator 45 when ignition switch 11 closes. With headlamp switch 15 in the ON condition, battery voltage will be connected through diode 47 to junction 48 to produce a voltage at the inverting input of comparator 45 of approximately 0.95 $V_{DD}$; and the output of comparator 45 will thus be ground, whereby the activation of DRL relay 22 is defeated. If headlamp switch 15 is in one of the OFF or PARK conditions, however, the voltage on the inverting input of comparator 45, as determined by resistors 50 and 62 in series with high beam filaments 23 and 25, will be approximately 0.44 $V_{DD}$ and the output of comparator 45 will thus be open collector to allow activation of DRL relay 22, as already stated, assuming park brake switch 13 is open. Once DRL relay 22 is activated, the voltage on the inverting input of comparator 45 goes up to approximately 0.72 $V_{DD}$ due to the presence of half battery voltage at the junction of high beam filaments 23 and 25; but this is still insufficient to ground the output of comparator 45.

In the circuit as described to this point, if high beam filament 23 were to burn out with DRL activated and high beam filaments 23 and 25 thus connected in series, their junction would be at approximately battery voltage rather than half battery voltage; and a voltage higher than that on the non-inverting input of comparator 45 would be applied through resistor 62 to junction 48 and therefore to the inverting input of comparator 45. The output of comparator 45 would thus be grounded, just as if the headlamps had been turned on by headlamp switch 15. But the grounding of the output of comparator 45 would turn off transistor 33 to deactivate DRL relay 22; and when DRL relay 22 was deactivated, the full battery voltage would disappear from the junction of filaments 23 and 25, so that comparator 45 would again switch open collector to allow transistor 33 to once again activate DRL relay 22. The cycle would then repeat in an oscillating manner. It is desirable that a burned out filament 23 not cause such oscillation but that a signal be given to the vehicle operator, since, in the daylight, the loss of a lower intensity headlamp may not be easily noticed from within the vehicle. The detection of the difference between normal headlamp on by switch 15 and a burned out filament 23 is accomplished by the circuit around and including comparator 56 and additional circuitry as described below.

A PNP transistor 63 has an emitter connected to terminal $V_{DD}$, a base connected through a resistor 65 (20K) to the collector of transistor 33 and a collector connected through a diode 66 and capacitor 70 (0.33 uF) to ground. A bias resistor 68 (5K) may optionally connect the emitter and base of transistor 63. Transistor 63 is thus connected to charge capacitor 70 through diode 66 when DRL relay 22 is activated. The junction of diode 66 and capacitor 70 is connected through a resistor 67 (110K) to the inverting input of comparator 56. The inverting input of comparator 56 is further connected through a resistor 71 (300K) to terminal $V_{DD}$ and through a resistor 72 (110K) and capacitor 73 (0.33 uF) in parallel to ground. A capacitor 57 (0.01 uF) connects the inverting and non-inverting inputs of comparator 56.

Figure 2A:
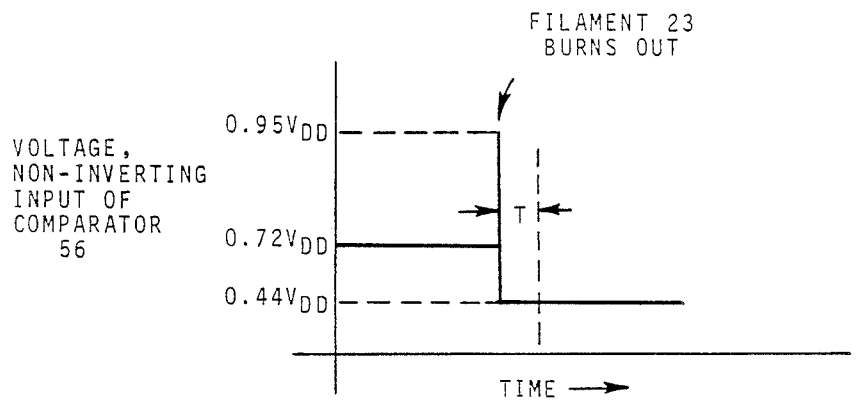
FIGS. 2a and 2b show the time variation of voltage at selected in the circuit of FIG. 1 with a burned out high beam filament to help illustrate the detection thereof.
Figure 2B:
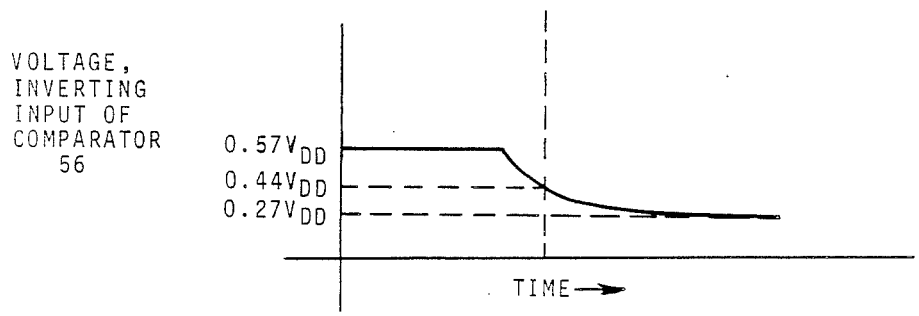

The operation of the circuit when high beam filament 23 burns out is illustrated by the curves of FIGS. 2a and 2b, which show the time variation of the voltage at the non-inverting and inverting inputs, respectively, of comparator 56. When transistor 33 turns on to activate DRL relay 22, transistor 63 is turned on to charge capacitor 70 through diode 66 to approximately 0.95 $V_{DD}$. This voltage and $V_{DD}$ applied to the network of resistors 67, 71 and 72 establish a voltage of approximately 0.57 $V_{DD}$ at the inverting input of comparator 56, as seen in FIG. 2b. The non-inverting input of comparator 56, as seen in FIG. 2a, will be at essentially the same voltage as the inverting input of comparator 45: approximately 0.72 $V_{DD}$ with DRL activated and both high beam filaments 23 and 25 operating. The output of comparator 56 is thus normally open collector and does not affect the rest of the circuit.

If high beam filament 23 burns out, however, the voltage at the junction of filaments 23 and 25 goes up to battery voltage, as shown in FIG. 2a; and comparator 45 turns off transistor 33 to deactivate DRL relay 22. However, it then immediately falls to approximately 0.44 $V_{DD}$ as DRL relay 22 is deactivated. The voltage at the inverting input of comparator 56, as seen in FIG. 2b, falls slowly as capacitor 70 discharges through resistors 67 and 72 in series. Although it eventually falls to a voltage of approximately 0.27 $V_{DD}$, which is below the 0.44 $V_{DD}$ of the non-inverting input, there is a period of time T, as shown in FIGS. 2a and 2b, wherein the inverting input is at the higher voltage and the output of comparator 56 thus goes to ground. Comparator 56 latches in this state due to the feedback through diode 53 and resistor 52, which pulls down the non-inverting input. The ground output of comparator 56 further holds comparator 45 in its ground output state to latch off DRL relay 22. The resulting lack of illumination of DRL on indicator light 21 indicates the problem to the vehicle operator. If an additional error light were desired to energize in this condition, it could be added with an energizing circuit responsive to the ground output state of comparator 56.

If it is filament 25 rather than filament 23 which burns out, the system works in a more direct manner to produce the same result. The junction of filaments 23 and 25 is thus grounded, which causes the voltage at the non-inverting input of comparator 56 to immediately drop below the 0.57 $V_{DD}$ on the inverting input to latch comparator 56 in its ground output state and hold DRL relay 22 in its deactivated state as already described.

In contrast to the condition of a burned out filament 23 or 25, a normal deactivation of DRL relay 22 due to the switching on of the headlamps by headlamp switch 15 does not latch on comparator 56, since the voltage on the non-inverting input of comparator 56 goes high and stays high if headlamp switch 15 is put in its ON condition. In addition, deactivation of DRL relay 22 by activation of park brake switch 13 causes the inverting input of comparator 56 to be immediately pulled down to just above ground by diode 58 to prevent latching of comparator 56 in the ground output state as DRL relay 22 is deactivated and the voltage on the non-inverting input of comparator 56 drops to 0.44 $V_{DD}$.

The system may be reset from the latched ground output of comparator 56 in any of three ways. If park brake switch 13 is closed, the inverting input of comparator 56 is lowered to one diode drop above ground to unlatch the comparator from its ground output state. If headlamp switch 15 is placed in the on condition, a high voltage will be applied to the non-inverting input of comparator 56 to unlatch it from its ground output state. Finally, if ignition switch 11 is turned off and then on again, the system will be reset with comparator 56 unlatched in the open collector state.

Figure 3:
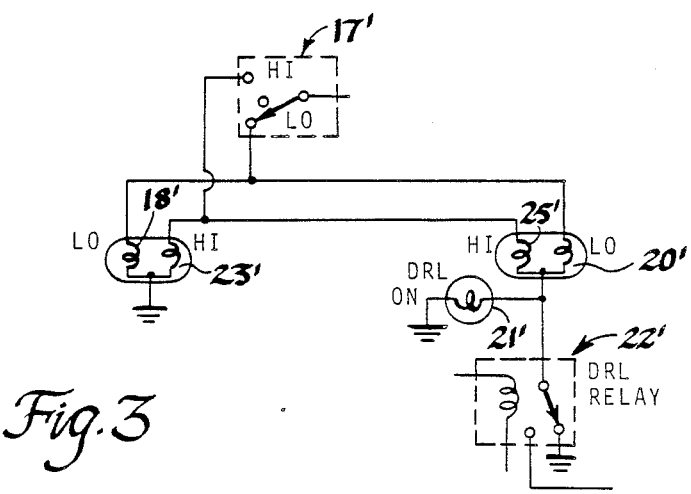
FIG. 3 shows a variation of the embodiment of FIG. 1.

It is possible that a vehicle owner could place different types of headlamps on the two sides of the vehicle. For example, filament 23 could be an incandescent bulb and filament 25 a halogen bulb. These bulbs may not split the full battery voltage evenly between themselves when connected in series. No such combinations of bulbs have shown such a wide disparity of operating voltages when warmed up and fully on; however, if an incandescent bulb and halogen bulb are placed in series, the halogen bulb will take almost the full battery voltage, after power is first applied, for a short time which may be as long as 100 milliseconds. Thus, the system could potentially be fooled into thinking the incandescent bulb was burned out for this short time period. If this is considered a potential problem, a capacitor 75 (0.33 uF) is connected from the inverting input of comparator 45 to ground. The charging of capacitor 75 causes a delay with a time constant of about 130 milliseconds from the moment when DRL relay 22 is activated and the voltage at junction 48 first goes higher than 0.44 $V_{DD}$ before the non-inverting input of comparator 45 can go high enough to ground the output and turn off DRL relay 22. In the meantime, the halogen and incandescent bulbs will have come within an acceptable voltage ratio for normal operation as previously described. It should be noted that the situation of halogen and incandescent bulbs on the same vehicle could only occur, at least at the time this is being written, in dual filament bulbs, which are connected as shown in FIG. 3.

It has already been mentioned that the activating coil of fog lamp relay 26 is connected to the collector of transistor 30. Transistor 30 has a base connected through series resistors 77 (10K) and 78 (10K) to ground. The junction of resistors 77 and 78 is connected to the collector of transistor 63. Thus, transistor 30 is turned on and off, through transistor 63, by transistor 33. In addition, a diode 80 is connected from the collector of transistor 30 to the junction of high beam filaments 23 and 25. In operation, the activating coil of fog lamp relay 16 will be enabled in the normal manner by connection to ground through diode 80 and the high beam filaments 23 and 25 when the high beam filaments are not energized. In this case, movement of headlamp switch 15 into the park condition will complete the circuit through the activating coil of fog lamp relay 16 to energize fog lamps 27 and 28. However, full energization of the high beam filaments 23 and 25 will reverse bias diode 80 to prevent such enabling of the activating coil of fog lamp relay 16.

When headlamp switch 15 is in its park condition and high beam filaments 23 and 25 are energized at half battery voltage by DRL relay 22, the half battery voltage drop from battery 10 to the junction of filaments 23 and 25 may not be sufficiently high to activate fog lamp relay 16. However, fog lamp energization is desired in this case, where high beam filaments 23 and 25 are not fully energized. Therefore, transistor 30 provides an alternate activating current path to ground for the activating coil of relay 16 when turned on by transistor 33. Thus, fog lamp operation is permitted with DRL high beam operation at reduced intensity but prevented with normal full intensity high beam operation.

A high beam indicator lamp 81 is connected to ground from the collector of a PNP Darlington transistor 82 having an emitter connected to junction 48 and a base connected to the emitter through a biasing resistor 83 (4K), to ground through a resistor 85 (5K) and, through a resistor 86 (3K) to junction 32. Transistor 82 conducts to energize high beam indicator lamp 81 only when the voltage at junction 48 is two diode drops above that (about 0.6 $V_{DD}$) set by the voltage divider of resistors 85 and 86 across the ignition voltage. This occurs only when ignition switch 11 is closed, headlamp switch 15 is ON and beam selector switch 17 is HI to provide full high beam filament energization. High beam indicator lamp 81 cannot be energized by transistor 82 turned on directly from headlamp switch 15 through diode 47, since the 85K resistance of resistor 62 is much greater than the 20 ohm resistance of lamp 81. In addition, activation of DRL relay 22 causes only half battery voltage to appear at the emitter of transistor 82, which keeps transistor 82 turned off.

A resistor 87 (5K) is connected in parallel with park brake on indicator lamp 12 to enable the rest of the circuit to work normally if lamp 12 burns out. The 5K value is sufficiently low to enable circuit operation but sufficiently high to reduce power consumption in normal circuit operation and allow the use of a low wattage resistor for reduced cost. For further stability and protection in the circuit, a capacitor 88 may be connected across the inputs of comparator 56; and a diode 90 may be connected from the collector of transistor 33 to $V_{DD}$.

The embodiments of the invention in which an exclusive property or privilege is claimed are defined as follows:

1. A headlamp system for a vehicle with an engine and an ignition switch effective to enable engine operation, the headlamp system comprising, in combination:
   a source of electric power at a predetermined supply voltage;
   a pair of headlamps on the front of the vehicle, one on each side thereof;
   a headlamp switch having closed and open conditions;
   a DRL enabling means;
   first circuit means connecting one of the headlamps in series with the headlamp switch and electric power source;
   a DRL activating switch effective in a first condition to connect the other of the headlamps in parallel with the one of the headlamps and in a second condition to connect the other of the headlamps in series with the one of the headlamps and the electric power source; and
   second circuit means responsive to the ignition switch, headlamp switch and DRL enabling means to put the DRL activating switch in its second condition when the ignition switch is activated, the DRL enabling means is enabled and the headlamp switch is in an open condition, whereby the headlamps are both energized at approximately half the predetermined supply voltage for improved visibility of the vehicle to other vehicle operators, and otherwise to put the DRL activating switch in its first condition, whereby the headlamps may both be energized with the full predetermined supply voltage for illumination of the road for vehicle operation with the headlamp switch in its closed condition.

2. The headlamp system of claim 1 wherein the vehicle further comprises brake means for preventing vehicle movement and the DRL enabling means is responsive to the activation of the brake means to be activated only when the brake means is not activated.

3. The headlamp system of claim 1 wherein the headlamps comprise high beam filaments.

4. The headlamp system of claim 2 wherein the headlamps comprise high beam filaments.

5. The headlamp system of claim 1 further comprising third circuit means effective when the DRL activating switch is in its second condition to sense a voltage between the headlamps connected in series and latch the DRL activating switch into its first condition and provide a signal when such voltage indicates a burned out headlamp.

6. The headlamp system of claim 3 further comprising a fog lamp, a fog lamp switch, and third circuit means responsive to the fog lamp switch and the second circuit means to connect the fog lamp in series with the electric power source for energization with closure of the fog lamp switch when the high beam filaments are not connected across the electric power source or are connected in series across the electric power source but prevent such energization when the high beam filaments are connected in parallel across the electric power source.

7. A headlamp system for a vehicle with an engine and an ignition switch effective to enable engine operation, the headlamp system comprising, in combination:
   a source of electric power at a predetermined supply voltage;
   a pair of headlamps on the front of the vehicle, one on each side thereof, each of the headlamps having a high beam filament;
   a headlamp switch having closed and open conditions;
   a DRL activating switch comprising a common terminal, a normally open terminal and a normally closed terminal and being connected in series with the headlamps in series and the electric power source through the common and normally open terminals, the DRL activating switch further comprising an activating means effective only when activated to change the connection of the common terminal from the normally closed terminal to the normally open terminal;

a high beam selector switch connected, when in a high beam selected condition, in series with one of the headlamps, the headlamp switch and the electric power source and further in series with the other of the headlamps, the headlamp switch and the electric power source through the common and normally closed terminals of the DRL activating switch;

a DRL enabling means;

third circuit means effective, unless overridden, to connect the activating means of the DRL activating switch in series with the electric power source for activation of the DRL activating switch when the ignition switch is closed;

fourth circuit means responsive to the DRL enabling means to override the third circuit means and prevent activation of the DRL activating switch unless the DRL enabling means is activated; and fifth circuit means responsive to the headlamp switch to override the third circuit means and prevent activation of the DRL activating switch when the headlamp switch is in its closed condition.

8. The headlamp system of claim 7 wherein the vehicle further comprises brake means for preventing vehicle movement and the DRL enabling means is responsive to the activation of the brake means to be activated only when the brake means is not activated.

9. The headlamp system of claim 7 in which the third circuit means comprises a first transistor switch connected in series with the activating means of the DRL activating switch, the ignition switch and the electric power source and having a control terminal by which it may be activated when the ignition switch is closed or deactivated by the fourth or fifth circuit means, and the fifth circuit means comprises:

a first comparator normally having a first predetermined voltage applied to one input thereof and an output coupled to the control terminal of the first transistor switch;

a resistive network connecting the other input of the first comparator to the electric power source and headlamp switch to generate, when the headlamp switch is in its closed condition and the headlamps are thus connected in parallel across the electric power source, a voltage effective, relative to the first predetermined voltage, to switch the comparator output so as to deactivate the first transistor switch, and otherwise, with neither headlamp burned out, to generate a voltage, relative to the first predetermined voltage, not so effective.

10. The headlamp system of claim 9 further comprising sixth circuit means effective when the DRL activating switch is activated to sense a voltage between the headlamps connected in series and latch the DRL activating switch into its first condition when such voltage, relative to the predetermined supply voltage, indicates a burned out headlamp.

11. A headlamp system for a vehicle with an engine and an ignition switch effective to enable engine operation, the headlamp system comprising, in combination:

a source of electric power at a predetermined supply voltage across first and second power supply terminals;

a headlamp switch;

a high beam select switch;

first and second headlamps on the front of the vehicle, one on each side thereof, the first headlamp having a high beam filament with one end connected through the high beam select and headlamp switches in series to the first power supply terminal and another end connected to the second power supply terminal;

a DRL activating switch comprising a common terminal, a normally open terminal connected to the first power supply terminal and a normally closed terminal connected to the second power supply terminal, the second headlamp having a high beam filament with one end connected to the one end of the high beam filament of the first headlamp to form a junction therebetween and another end connected to the common terminal of the DRL activating switch, the DRL activating switch further comprising an activating means effective only when activated by an electric current therethrough to change the connection of the common terminal from the normally closed terminal to the normally open terminal;

a DRL enabling switch connected in series with the ignition switch with a resistive load therebetween, the ends of the ignition and DRL enabling switches not connected to the resistive load being connected respectively to the first and second power supply terminals;

a transistor switch having a first conducting terminal connected to the second power supply terminal, a second conducting terminal connected through the activating means of the DRL activating switch to the junction of the ignition switch and resistive load, and a control terminal;

first circuit means coupling the electric power source, ignition switch, activating means of the DRL activating switch and transistor switch so as to normally produce conduction of the transistor switch to activate the DRL activating switch when the ignition switch is closed, the first circuit means further coupling the transistor switch to the DRL enabling switch to prevent such conduction of the transistor switch when the DRL enabling switch is closed;

a first comparator having a pair of inputs producing activation or no activation thereof and an output coupled to the transistor switch to prevent conduction thereof when the first comparator is activated;

a first voltage divider connected across the first and second power supply terminals and effective, when not overridden, to apply a first predetermined voltage to one of the inputs of the first comparator;

a second voltage divider connected across the first and second power supply terminals and effective, when not overridden, to apply a second predetermined voltage to the other input of the first comparator effective, relative to the first predetermined voltage, to prevent activation thereof;

second circuit means coupling the junction of the headlamp and high beam select switches to the second voltage divider and effective, when the headlamp switch is closed, to override the second voltage divider and apply a third predetermined voltage to the other input of the first comparator, relative to the first predetermined voltage, to cause activation of the first comparator, the second circuit means being further effective, when the headlamp switch is open and the DRL activating switch is activated, to apply a fourth predetermined voltage, intermediate the first and second predetermined voltages, to the other input of the first comparator relative to the first predetermined voltage, to prevent activation of the first comparator.

12. The headlamp system of claim 11 further comprising:
   third circuit means coupling the junction of the headlamps to the second voltage divider, the third circuit means being effective to override the first circuit means when the first or second headlamp burns out and change the voltage at the other input of the first comparator to a voltage essentially the same as that at the second or first power supply terminal, respectively;
   a second comparator having one input coupled to the other input of the first comparator to receive essentially the same voltage thereon, an output coupled to the one input of the first comparator to override the first voltage divider and activate the first comparator when activated and further coupled in feedback to the one input thereof to latch the second comparator in an activated state, and another input;
   fourth circuit means responsive to the transistor switch to generate and apply to the other input of the second comparator a fifth predetermined voltage when the transistor switch conducts and a sixth predetermined voltage when the transistor switch does not conduct, the fourth circuit means further providing a predetermined time delay in changing from the fifth to the sixth predetermined voltage when the transistor switch changes from conducting to not conducting, the fifth predetermined voltage being effective, relative to the second predetermined voltage, to prevent activation of the second comparator and the sixth predetermined voltage being intermediate the fifth and fourth predetermined voltages and further being effective, relative to the fourth predetermined voltage, to prevent activation of the second comparator, whereby, when the second headlamp high beam filament burns out, the second comparator latches the first comparator to cause deactivation of the DRL activating switch as the voltage at the junction of the high beam filaments crosses the sixth predetermined voltage and, when the first headlamp high beam filament burns out, the second comparator latches the first comparator to cause deactivation of the DRL activating switch after the voltage at the junction of the high beam filaments first changes in one direction to cause deactivation of the DRL activating switch and then immediately changes in the other direction to cross the voltage at the other input of the second comparator before it can complete its delayed change from the sixth to the fifth predetermined voltage.

13. The headlamp system of claim 11 wherein the vehicle further comprises brake means for preventing vehicle movement and the DRL enabling switch is responsive to the activation of the brake means to close only when the brake means is activated and wherein the resistive load is a brake means indicator light with a resistor in parallel therewith to substitute for the brake means indicator light if the latter burns out.

* * * * *